Nov. 7, 1967   A. A. DE KONING ET AL   3,351,160
REMOTELY CONTROLLED, ADJUSTABLE VALVE MEANS FOR SHOCK ABSORBERS
Filed April 30, 1965   2 Sheets-Sheet 1

INVENTORS
ARIE ADRIANUS DE KONING &
KORNELIS KORSTIAAN KAREL DE KONING
BY
Mason, Porter, Diller & Brown
ATTORNEYS

United States Patent Office

3,351,160
Patented Nov. 7, 1967

3,351,160
REMOTELY CONTROLLED, ADJUSTABLE VALVE
MEANS FOR SHOCK ABSORBERS
Arie Adrianus de Koning, Paradijs, and Kornelis Korstiaan Karel de Koning, Kwakseweg 1, both of Oud Beijerland, Netherlands
Filed Apr. 30, 1965, Ser. No. 452,079
Claims priority, application Netherlands, May 6, 1964, 64—5,036
4 Claims. (Cl. 188—88)

ABSTRACT OF THE DISCLOSURE

A telescopic shock damper is provided which includes a cylinder and a piston mounted on a piston rod, dividing the cylinder into two portions, two passage means being provided for fluid communication between the two cylinder portions, with valve means and a movable member adapted to respectively close the two passage means. A second piston is provided, disposed beyond the end of the piston rod, the position of the member which closes one of the passage means being adjustable and positionable depending upon the pressure acting upon the second piston.

---

The present invention relates to a telescopic shock damper comprising a cylinder and a piston mounted on a piston rod, dividing said cylinder into two portions and having provided therein one or a plurality of passages interconnecting the two cylinder portions, said passages being sealed by a spring-urged valve in the inoperative position of the shock damper, said piston rod being adapted to have likewise one or a plurality of passages interconnecting the two cylinder portions and capable of being entirely or partly opened or closed by a member movable along the piston rod.

A shock damper of this type is known.

In a known structure the valve sealing the passage in the piston is under a pre-adjusted spring tension, the passage in the piston rod being adjustable by turning a member projecting beyond the cylinder. This renders it possible for the shock damper to be manually adjusted from the outside, whereby only the passage through the piston rod is controlled.

During the operation the adjustment of the shock damper is maintained in the same position.

Upon an increase in the piston velocity, the resistances in the passage through the piston as well as in the passage through the piston rod will strongly increase. For a greater lifting height of the valve sealing the piston passage causes a higher spring tension and an increasing flow resistance, while, upon an increase in the quantity of damping medium flowing through, the resistance in the passage through the piston rod, which passage is constant during the operation of the shock damper, increases highly progressively.

With the present air and hydraulic spring systems the piston velocities in the shock damper may be so high that the damping forces caused thereby are disadvantageous for the properties of the spring system and for the structure of the shock damper.

To obviate these drawbacks the invention has for its object to provide a shock damper of which the damping forces at high piston velocities are within acceptable values, and of which, besides, the adjustment can be made continuously dependent on a magnitude outside the shock damper, for example, the pressure in an air spring bellows. To this end the shock damper, according to the invention, is so constructed that the member movable along the piston rod is at the same time designed as a spring disc for the valve spring and connected to a member, for example, a second piston, the position of which is influenced by the pressure of a medium fed from outside the shock damper.

By this is achieved that, with a given adjustment of the shock damper, the damping force is fixed both by the passage in the piston rod and by the spring tension of the valve sealing the passage in the piston, and that an increased piston velocity and a greater lifting height of the piston valve caused thereby has no or substantially no influence on the tension of the valve spring, the passage through the piston rod being enlarged, however.

As a result of this the damping forces will be within acceptable limits even at very high piston velocities.

The invention will now be illustrated hereinbelow with reference to an embodiment shown in the accompanying drawings.

Figure 1:
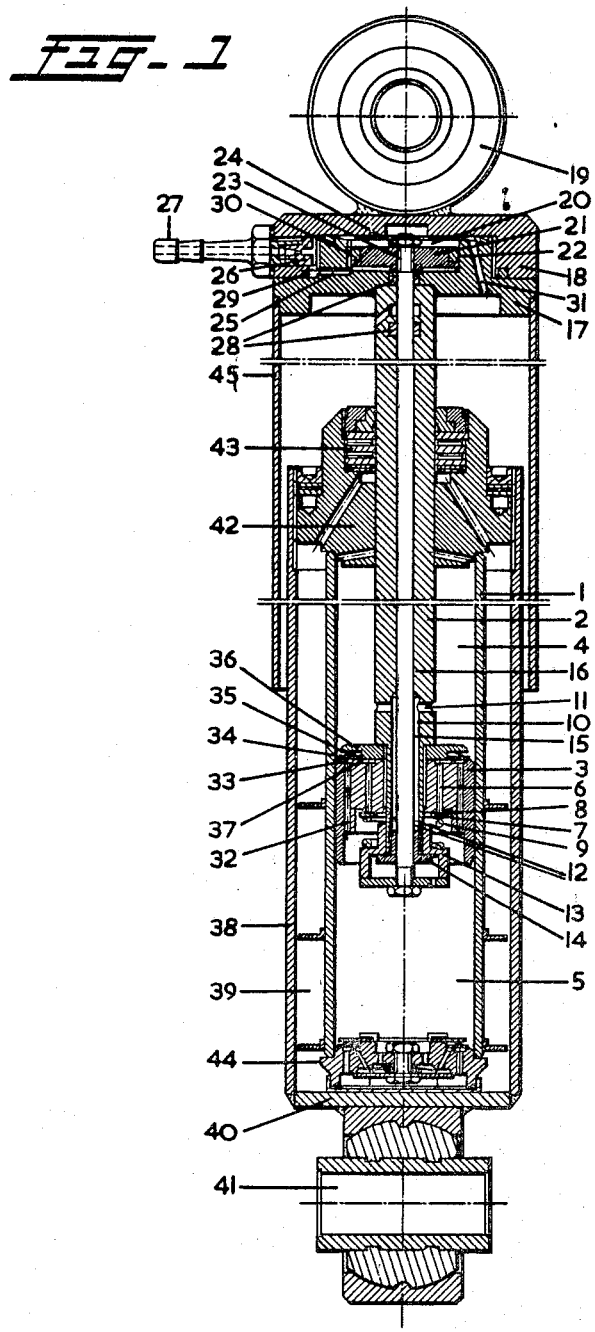
FIG. 1 is an axial section through a shock damper according to the invention.

Referring to FIG. 1, 1 is the cylinder of a telescopic shock damper, wherein a piston 3 mounted on a piston rod 2 divides the cylinder into two portions 4 and 5.

The piston 3 has one or a plurality of passages in the form of bores 6, which are sealed by a valve 7 which is biassed against a seat 8 of the piston 3 by a spring 9.

The piston rod 2 has an axial bore 10 which on the one hand is connected to the cylinder portion 4 by transverse bores 11 and on the other hand to the cylinder portion 5 by transverse bores 12. The bores 12 can be completely or partly covered by a sleeve 13, which is at the same time designed as a disc for the spring 9 and, in the inoperative position, bears against a stop plug 14 which is screwed into the piston rod 2 and seals the end of the longitudinal bore 10. The sleeve 13 is connected to one end of a rod 15 passing with tolerance through the longitudinal bore 10 and guided by the plug 14, and a bore 16 extending throughout the further length of the piston rod 2. At the other end projecting beyond the shock damper the piston rod 2 is connected to a cover consisting of two parts 17, 18, on which is provided an attachment for this end of the shock damper, in this example an eye 19. Between the two cover sections 17 and 18 is provided a chamber 20 wherein a second piston 21 having suitabel sealing means can reciprocate. The piston 21 is so mounted to the end of the piston rod 15, in this case by means of screw thread 23 and a locking nut 24, that, after removal of the cover section 18, the position of the piston 21 is adjustable relative to rod 15 by means of the eye 19.

Radially terminating into the part of chamber 20 situated under the piston 21 is a supply opening 25 which is connected to a nipple 27 having a throttle plug 26, to which nipple a source of control medium can be connected.

Suitable sealing means 28, 29, and 30 are provided to keep the control medium separated from, respectively, the damping medium in cylinder 1, the outer air, and the space in chamber 20 situated above piston 21. Besides this last-mentioned space communicates with the outer air by way of a passage 31.

For the operation of the shock damper are furthermore required a second set of bores 32 in the piston 3, sealed on the seat 33 by a valve 34 having a spring 35 and an abutment ring 36, which are so shaped as to leave a chamber 37 in open communication with the cylinder portion 4, a tube 38 provided around the cylinder 1 and forming a reservoir 39 for the damping medium, and closed at the underside by a bottom 40 having an eye 41 for attachment of the shock damper. The top of the tube 38 is closed by a piston rod guide 42 including a rod gasket 43. Arranged between the cylinder 1 and the bottom 40 is a foot valve 44 for controlling the damping medium flow between the reservoir 39 and the cylinder space 5. To protect the piston rod 2 there is mounted to the cover section 17 a tubular dust hood 45 movable about the tube 38.

The operation of the shock damper is as follows.

In operation the shock damper has its eyes 19 and 41 connected to, respectively, the sprung and non-sprung parts of a vehicle, and the nipple 27 is connected to a pressure source, which may, for example, consist of a bellows of an air or hydraulic spring system of a vehicle if the damping characteristics of the shock damper have been made dependent on the load on the vehicle.

The pressure medium acts on the under side of the piston 21 by way of the plug 26 and the bore 25. Said piston 21 will move upwards, while the rod 15 secured to the piston moves the sleeve 13. Thus the valve spring 9 is compressed and the spring tension increased until an equilibrium is reached with the pressure of the control medium under the piston 21. When the sleeve 13 moves upwards along the piston rod 2, one or more of the bores 12 can be sealed off, as a result of which the passage through the piston rod is reduced. In this manner the shock damper has been adjusted in dependence of the control medium pressure.

It will be understood that at a higher medium pressure the adjustment will be heavier and at a lower medium pressure lighter. During the outward stroke of the shock damper the damping medium present in the cylinder portion 4 is displaced to the cylinder portion 5 by way of bores 11, 10, and 12, the last-mentioned one insofar as it is not covered. At a predetermined pressure of the damping medium in the cylinder portion 4, at which an equilibrium has been reached with the tension of the valve spring 9, the damping medium will lift the valve 7 from the seat 8 and be capable of flowing across by way of the bores 6 as well.

Figure 2:
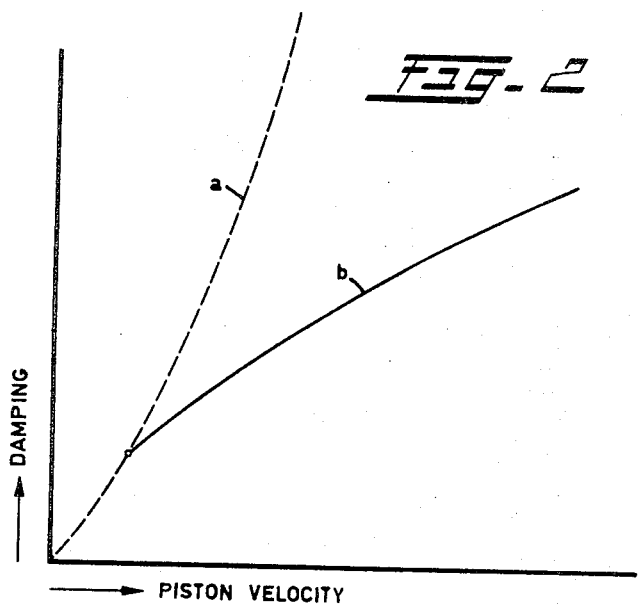
FIG. 2 and FIG. 3 show diagrammes representing the damping curve upon an increase in the piston velocity of the known shock damper and the shock damper according to the invention, respectively.

If the sleeve 13 had a fixed adjustment, the damping force, at an increasing piston velocity, would run according to line $a$ in FIG. 2 as regards the throughflow of an increasing volume of damping medium through the bores 12 which are constant then, and according to line $b$ in FIG. 2 as regards the flow along the valve 7, which will be lifted further according as the quantity of throughflowing damping medium increases. With the assumed fixed adjustment the valve spring 9 is compressed when the lifting height of the valve 7 increases, owing to which the through-flow resistance is also getting higher.

Figure 3:
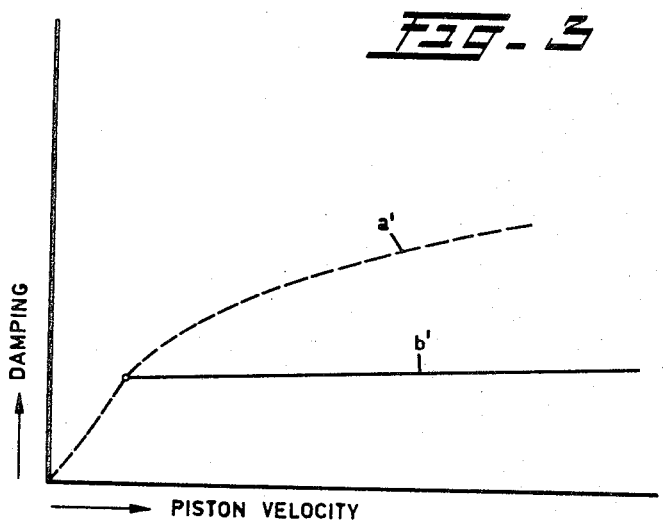

In FIG. 3 is shown how the ratio between the damping force and the piston velocity will be in the structure according to the invention.

On account of the suspended mounting of the sleeve 13 to the piston 21 and when the valve 7 is opened owing to the pressure of the damping medium in the cylinder portion 4, the spring 9, the sleeve 13, the rod 15, and the piston 21 will move along until the pressure of the damping medium on the valve 7 is so reduced owing to the enlarged through-flow surface caused by the greater lifting height of the valve that a new equilibrium is reached. It should be realized that when opening the valve 7 to a greater or less extent the tension of the valve spring 9 remains entirely or substantially the same, while the sleeve 13 in a lower position releases one or more of the bores 12. As a consequence the line $a'$ in FIG. 3 will be considerably more smooth than the line $a$ in FIG. 2 due to the increasing passage at a higher piston velocity, while the line $b'$ in FIG. 3 is also more smooth than the line $b$ in FIG. 2 due to the substantially constant tension of the valve spring 9.

In order to obtain a pre-adjustment of the damping value for a special type of vehicle, the attachment of the second piston 21 to the rod 15 is adjustable, said second piston 21 being adapted to rest on the bottom of the chamber 20 in its lowermost position, thus serving as an abutment for a lowest damping value to be obtained. The adjustment of the piston 21 to the rod 15 can be effected very simply after removal of the cover section 18 including the eye 19.

The supply 25 to the chamber 20 is disposed at an angle with the axis of the shock damper to keep the space required for housing the chamber 20 as low as possible, which is to the benefit of the building height of the shock damper. Moreover it is possible to apply different types of shock damper attachment, eye, pin, and the like, because the control medium supply is not affected by the shock damper attachment.

To render the system somewhat insensitive to brief fluctuations in the control medium pressure, the inlet 27 is provided with a plug 26 having a restricted passage.

It will be understood that the same effect can be produced, but then for the inward stroke of the shock damper, if the valve 34 cooperates in a corresponding way with a member adjusting the passages 12, 10, 11.

We claim:

1. A telescopic shock damper compressing a cylinder and a piston mounted on a piston rod, dividing said cylinder into two portions and having provided first passage means in said piston interconnecting the two cylinder portions, said first passage means being sealed by a valve in the inoperative position of the shock damper, said piston rod being adapted to have second passage means interconnecting the two cylinder portions and capable of being at least partially opened or closed by a member movable along the piston rod, wherein said valve is formed by a rigid spring loaded disc, said member being designed as a spring disc for the valve spring and connected to a second piston disposed outside said piston rod, the position of said second piston being adjustable in response to pressure of a medium fed from outside the shock damper, wherein said piston rod is hollow and the connection between said member and said second piston is formed by a rod axially movable in the hollow of said piston rod, the attachment of the rod movable in the hollow piston rod to said member or to the second piston is adjustable, and the second piston, in the inoperative position, acts as an abutment so that the pretension of the valve spring is adjustable as circumstances require.

2. Telescopic shock damper as claimed in claim 1, wherein the second piston is housed in a chamber disposed between the end of the piston rod and the shock damper attachment at the piston rod side, and wherein the pressure medium fed from outside the shock damper is supplied at an angle with the axis of the shock damper.

3. Telescopic shock damper as claimed in claim 2, wherein the supply line of the pressure medium to the chamber has an exchangeable throttle plug.

4. The shock damper of claim 1, wherein said member is constructed as a sleeve surrounding said piston rod.

References Cited

UNITED STATES PATENTS

| 2,950,785 | 8/1960 | Patriquin | 188—87 X |
| 3,146,862 | 9/1964 | Van Winsen | 188—87 X |
| 3,256,960 | 6/1966 | Casimir | 188—87 |

FOREIGN PATENTS

| 1,097,456 | 2/1955 | France. |
| 736,431 | 9/1955 | Great Britain. |

MILTON BUCHLER, *Primary Examiner.*

G. E. HALVOSA, *Assistant Examiner.*